Feb. 19, 1952  L. BIRKIGT  2,586,293
SPINNING SPINDLE MECHANISM, IN PARTICULAR OF THE
WORM AND WORM WHEEL DRIVE TYPE
Filed Feb. 21, 1951
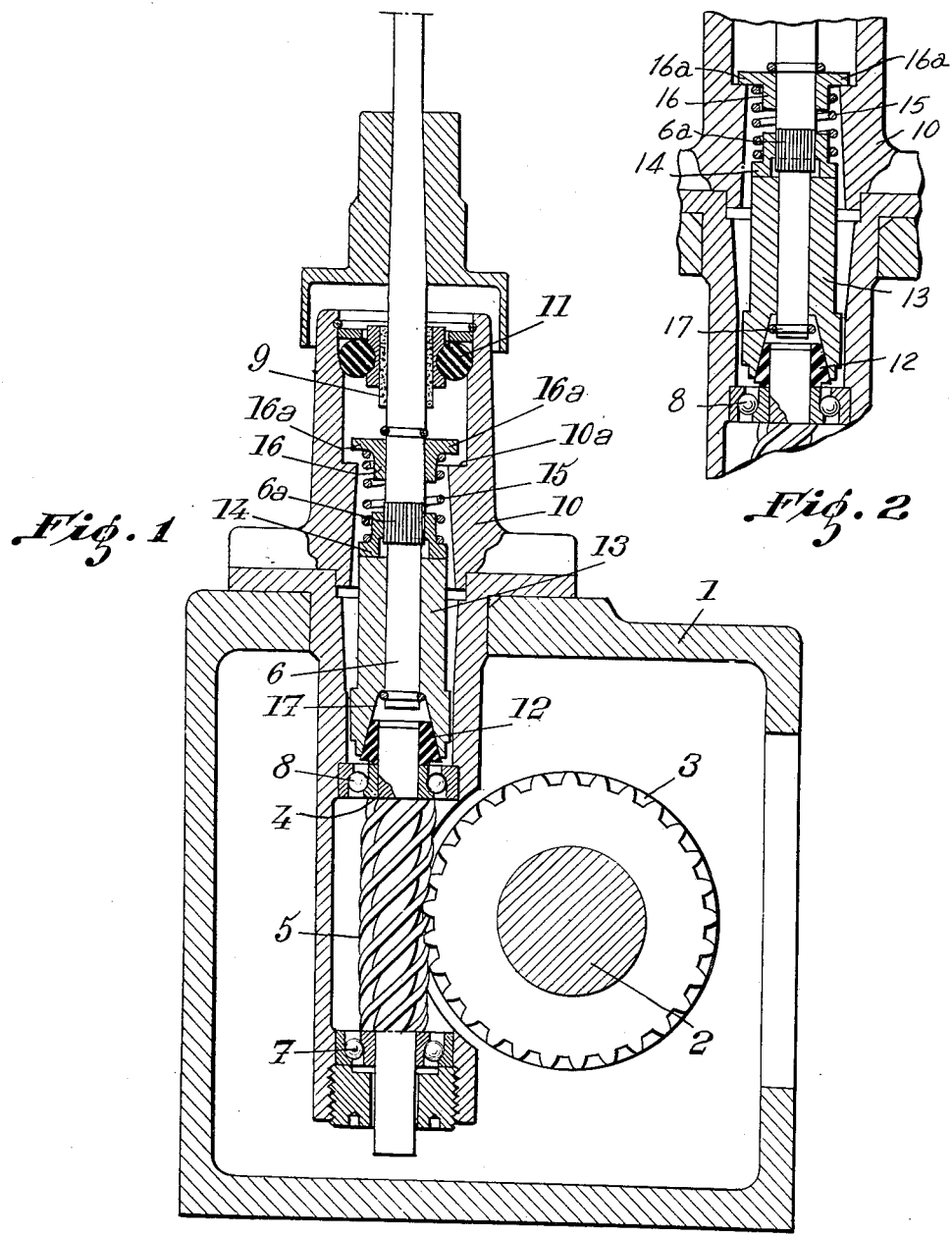
INVENTOR
LOUIS BIRKIGT,
BY
Robert B Larson
ATTORNEY Patented Feb. 19, 1952

2,586,293

UNITED STATES PATENT OFFICE 2,586,293

SPINNING SPINDLE MECHANISM, IN PARTICULAR OF THE WORM AND WORM WHEEL DRIVE TYPE

Louis Birkigt, Versoix-Geneva, Switzerland, assignor to Hispano Suiza (Suisse) S. A., Geneva, Switzerland, a society of Switzerland Application February 21, 1951, Serial No. 212,118
In Luxemburg February 27, 1950

5 Claims. (Cl. 57—102)

The present invention relates to spinning spindle mechanisms and more particularly, but not exclusively, spinning spindle mechanisms of the worm and worm wheel drive type.

Its chief object is to provide apparatus of this kind which are better adapted to meet the requirements of practice.

A preferred embodiment of my invention will be hereinafter described with reference to the accompanying drawings, given merely by way of example and in which:

Fig. 1 shows in axial cross-section a spinning spindle of the worm and worm wheel type made according to my invention; and Fig. 2 shows a portion of said spindle when the spindle is in its lower position.

Inside a casing 1, adapted to be fitted on a suitable support, is mounted a horizontal transverse shaft 2 carrying a worm wheel 3 for driving the spindle.

In said casing 1 is mounted a shaft 4 supporting the teeth 5 of the worm intended to mesh with worm wheel 3, this shaft, which serves to drive the cop carrying spindle 6 of the spindle mechanism, being held by two bearings, to wit for instance a lower bearing 7 and an upper bearing 8 located respectively below and above the zone in which worm wheel 3 and worm 5 tangentially engage each other.

Spindle 6 is preferably mounted in such manner that its inclination can vary so that the whole is automatically centered in correct fashion, account being taken of irregularities in the distribution of the yarn on the cop.

For this purpose, spindle 6 is advantageously guided, at its upper part, by a bearing 9 held in a tubular piece 10 fixed to the upper wall of casing 1, with a rubber ring 11 interposed between said bearing and said tubular piece.

The lower end of spindle 6 is coupled with shaft 4 through a rubber cone 12 securely held, for instance, on the end of said shaft 4, which cone then acts both as means for centering the spindle (said cone tending to bring the spindle axis into coincidence with the worm axis) and as means for driving said spindle as it will be explained hereinafter.

In some cases, shaft 4 might be coupled directly with spindle 6 by means of cone 12, but, as a rule, it seems preferable to couple said shaft with an intermediate piece, such for instance as a sleeve 13 mounted loosely on spindle 6 and itself coupled with said spindle through a device making it possible, without danger of heating, for said sleeve and said spindle to slip in rotation with respect to each other, whereby the spindle can be stopped without making it necessary to stop the drive mechanism or to cause cone 12 to slip.

Such an indirect coupling of shaft 4 and spindle 6 can be made for instance as follows:

I provide, at the base of sleeve 13, a conical hollow in which cone 12 fits, the apex of said cone being preferably turned upwardly.

I apply, against the upper edge of said sleeve, a friction disc 14 slidable on spindle 6 but rotatable together therewith, owing to a spline connection 6a.

I subject disc 14 to the action of a spring 15 urging it toward the upper edge of sleeve 13, said spring bearing against an axial thrust bearing 16 provided for this purpose on spindle 6, which, of course, includes an annular ring 17 which limits its upward movement and consequently keeps spring 15 compressed.

It will be readily understood that, with such an arrangement, in case of the cop being stopped, slipping will take place between the contacting faces of sleeve 13 and disc 14, the whole of shaft 4 and sleeve 13 keeping normally rotating.

Furthermore, it will be of interest, in order to absorb the shocks resulting from the insertion of a cop on spindle 6—which insertion is performed by a vertical downward movement—to mount said spindle in such manner that it can move down a certain distance against the action of a spring 15, so that ribs 6a must extend over a length sufficient for keeping spindle 6 and disc 14 permanently coupled together in rotation.

However, such a shock absorbing mounting of spindle 6 might leave the possibility of injury of the spindle mechanism in the case of a violent setting of the cop into position on said spindle. For, in this case, the spindle would strike, at the end of its downward movement, the upper end of shaft 4 and would transmit the shock to the parts of the apparatus (roller bearings, driving means, etc.) located inside casing 1.

In order totally to eliminate any risk of this kind, spindle 6 is advantageously provided with an axial thrust bearing constituted for instance, in the example shown, by a collar 16a bearing, before the spindle has been moved right down, against a shoulder 10a rigid with tubular piece 10, and therefore also rigid with casing 1.

In order better to illustrate the function performed by collar 16a and shoulder 10a, I have shown in Fig. 1 the axial position occupied by spindle 6 during normal operation. In Fig. 2, I have shown the position assumed by the same part under the effect of a violent setting of the cop. It will be seen that, in this case, collar 16a strikes shoulder 10a, thus preventing any shock of the lower end of spindle 6 against shaft 4 and any excessive fatigue of the parts of the apparatus which serve to guide and to drive said shaft.

My spinning spindle mechanism is of a great simplicity and the guiding or driving parts thereof, located in line with the cop carrying spindle, do not risk being deteriorated by a violent setting of the cop on said spindle.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A spinning spindle mechanism which comprises, in combination, a casing, a cop carrying spindle journaled with respect to a wall of said casing, means in said casing for guiding and driving said spindle, said spindle being slidable in the direction of its axis with respect to said casing, means interposed between said casing and said spindle for yieldingly opposing axial sliding of said spindle toward said casing, and abutment means respectively carried by said spindle and said casing for positively limiting the sliding displacements of said spindle toward said casing.

2. A mechanism according to claim 1, said casing including a tubular extension coaxially surrounding said spindle, said respective abutment means including a collar rigid with said spindle and an inward shoulder belonging to said tubular extension.

3. A spinning spindle mechanism which comprises, in combination, a casing, a cop carrying spindle journalled with respect to a wall of said casing, means in said casing for guiding and driving said spindle, slipping clutch means for coupling said spindle with said driving means, said spindle being slidable in the direction of its axis with respect to said casing, means interposed between said casing and said spindle for yieldingly opposing axial sliding of said spindle toward said casing and holding said clutch means engaged, and abutment means respectively carried by said spindle and said casing for positively limiting the sliding displacements of said spindle toward said casing.

4. A spinning spindle mechanism which comprises, in combination, a casing, a cop carrying spindle journalled with respect to a wall of said casing, spindle driving means including a worm and a worm wheel located in said casing, said worm being substantially coaxial with said spindle, means including a cone for coupling said worm and said spindle, said spindle being slidable in the direction of its axis with respect to said casing, means interposed between said casing and said spindle for yieldingly opposing axial sliding of said spindle toward said casing, and abutment means respectively carried by said spindle and said casing for positively limiting the sliding displacements of said spindle toward said casing.

5. A spinning spindle mechanism which comprises, in combination, a casing, a cop carrying spindle journalled with respect to a wall of said casing, spindle driving means including a worm and a worm wheel located in said casing, said worm being substantially coaxial with said spindle, a sleeve slidable axially with respect to said spindle, but rotatable together therewith, said sleeve being provided with a conical housing, a cone fixed on said worm and fitting in said housing, said spindle being slidable in the direction of its axis with respect to said casing, means interposed between said casing and said spindle for yieldingly opposing axial sliding of said spindle toward said casing, and abutment means respectively carried by said spindle and said casing for positively limiting the sliding displacements of said spindle toward said casing.

LOUIS BIRKIGT.

REFERENCES CITED

The following references are of record in the file of this patent:

UNITED STATES PATENTS

| Number | Name | Date |
| --- | --- | --- |
| 1,070,982 | Nordell | Aug. 19, 1913 |
| 1,492,802 | Keyser | May 6, 1924 |
| 1,871,533 | Keyser | Aug. 16, 1932 |
| 2,478,979 | Portmann | Aug. 16, 1949 |

FOREIGN PATENTS

| Number | Country | Date |
| --- | --- | --- |
| 343,786 | France | Aug. 16, 1904 |